Jan. 19, 1932.     H. T. ANDERSON     1,841,515
BRAKE BEAM LEVELING AND SAFETY DEVICE
Filed Sept. 28, 1929    2 Sheets-Sheet 1
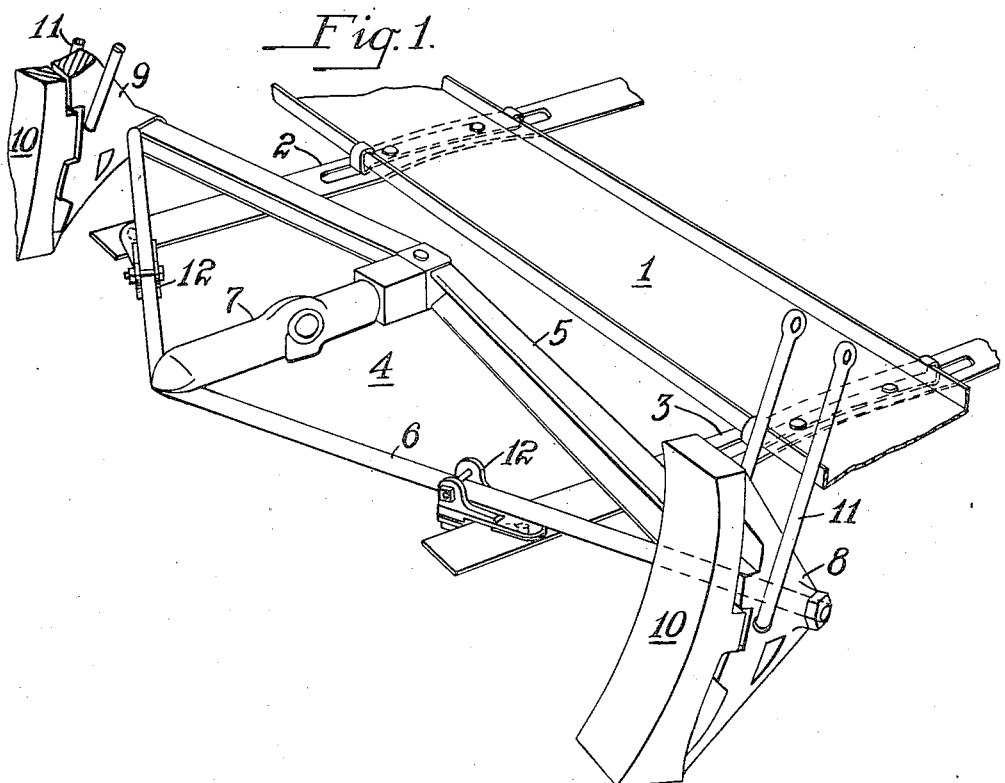
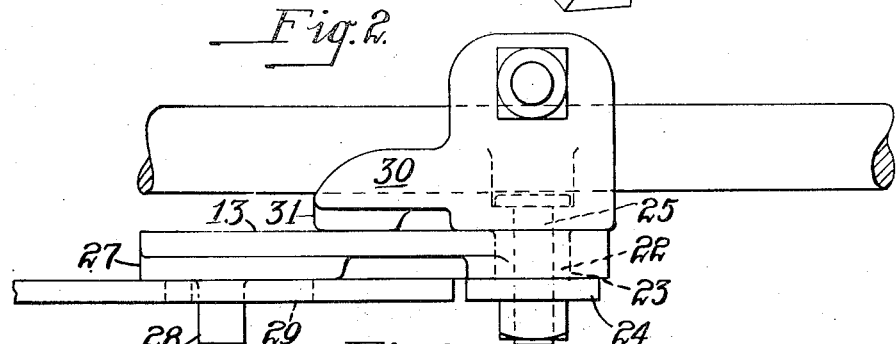
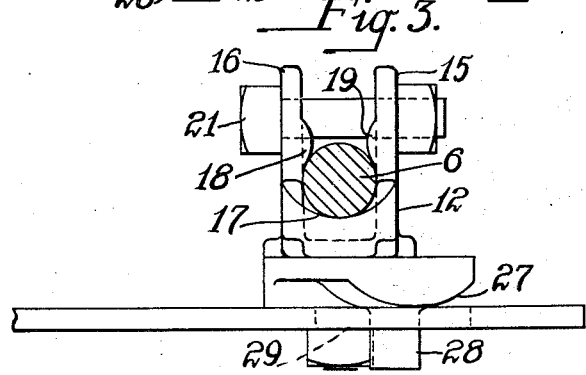
INVENTOR
Harry T. Anderson
By Green & McCallister
His Attorneys Jan. 19, 1932.  H. T. ANDERSON  1,841,515
BRAKE BEAM LEVELING AND SAFETY DEVICE
Filed Sept. 28, 1929  2 Sheets-Sheet 2
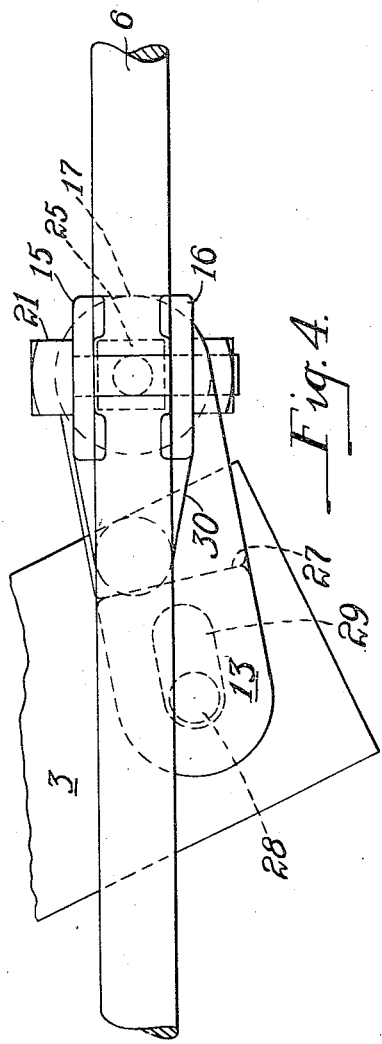
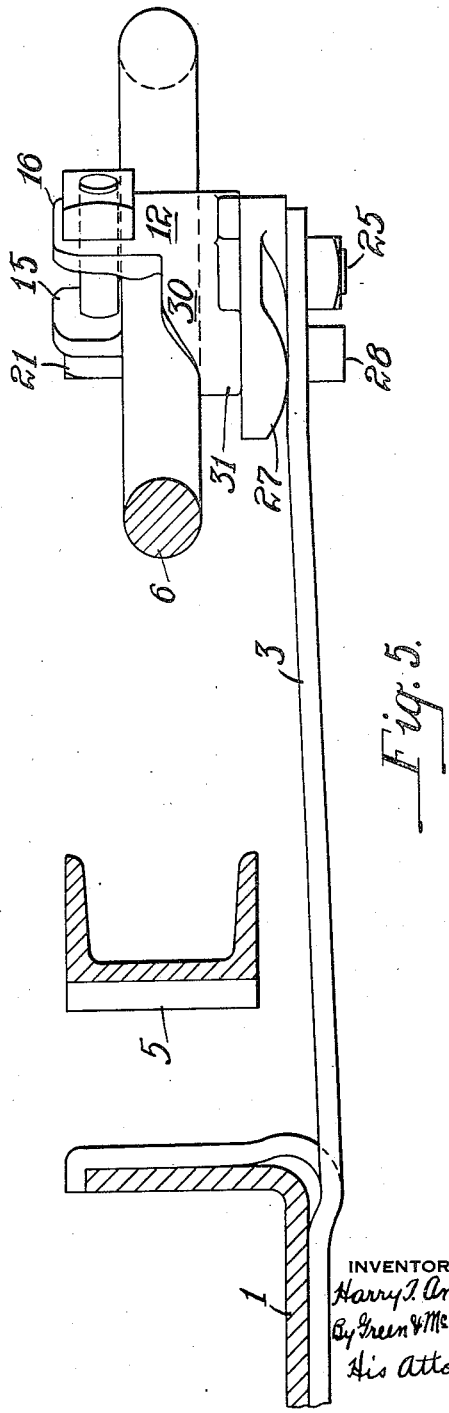
INVENTOR
Harry T. Anderson
By Green & McCallister
His Attorneys Patented Jan. 19, 1932

1,841,515

UNITED STATES PATENT OFFICE

HARRY T. ANDERSON, OF BUTLER, PENNSYLVANIA

BRAKE-BEAM LEVELING AND SAFETY DEVICE

Application filed September 23, 1929. Serial No. 395,969.

This invention relates to brake beams for railway cars, and particularly to leveling and safety devices therefor.

An object of this invention is to prevent the tilting of brake beams.

Another object of this invention is to so support a brake beam that the brake shoes carried thereby shall not drag upon the tread of the car wheels.

A further object of the invention is to so support the brake beam that all points on the surface of the brake shoes shall remain substantially parallel to the tread of the car wheels.

A still further object of the invention is to support a brake beam in substantially the same plane as it moves from brake release to brake application position and vice versa.

A still further object of the invention is to provide an improved "chair" for brake beams.

Other objects of the invention will, in part, appear hereinafter, and, in part, be obvious to those skilled in the art from the following description taken in conjunction with the accompanying drawings in which:

Figure 1 is a partial view in perspective of a brake beam safety and leveling device arranged and constructed in accordance with the invention;

Fig. 2 is a partial view in side elevation of the invention;

Fig. 3 is a partial view, partly in section, showing the brake-beam chair in a different position relative to that shown in Fig. 2.

Fig. 4 is a partial top plan view of the device shown in Figs. 2 and 3; and

Fig. 5 is an enlarged view, partly in transverse section, of the apparatus shown in Fig. 1.

In Fig. 1 of the drawings a spring plank 1 for railway car trucks is shown upon which spring members 2 and 3 are mounted. As shown the spring members are clamped over the upstanding flanges of the spring plank. The spring members 2 and 3 extend laterally from the spring plank in opposite directions and are disposed beneath brake beams 4, only one of which is shown. The spring members 2 and 3 constitute the subject-matter of my copending application Serial No. 383,525 for leveling and safety devices, filed August 5, 1929.

The brake beam 4 may be of any construction, and, for the purpose of illustration, a beam is shown that comprises a compression member 5, a tension member 6 and a strut 7. In accordance with usual practice brake heads 8 and 9 are disposed at the opposite ends of the brake beam. The brake heads 8 and 9 have mounted therein the usual brake shoes 10.

The brake beam 4 may be suspended from the truck frame, not shown, by hangers 11 of substantially U-shape. As the brake beam shown in the drawings is of well-known construction, it need not be described further in detail.

Since the ends of the spring members 2 and 3 extend underneath the brake beams 4, only one of which is shown, protection is provided in this respect that in the event the brake hangers 11 should break, or any part of the brake beam should become dismantled, the brake beam or parts thereof will be prevented from falling upon the rails of the track. In railway practice, it is desirable from the point of safety to safeguard against such contingencies because if the brake beam 4 should fall upon the rails there is a possibility of a train or several cars of a train being derailed. Aside from the question of safety, it is desirable that provision be made for maintaining the brake beam 4 in such a position that the top of the brake shoes will not ride or drag upon the thread of the car wheels, not shown, when the brakes are released. It is also desirable to so support the brake beam 4 that all points on the wearing surface of the brake shoes 10 will remain equi-distant from the tread of the car wheels. The position in which it is desired to maintain the brake beam 4, as shown in the drawings, is substantially a horizontal position. In applying or releasing the brakes, the brake beam 4 will then move back and forth in a horizontal plane.

In order to maintain the brake beam 4 in a substantially horizontal plane as it moves back and forth from brake release to brake application position, "chairs" 12 are provided. Each of the "chairs" 12 is mounted on a lever 13 that is pivotally mounted adjacent the ends of the spring members 2 and 3.

Since the "chairs" 12 are of similar construction, only one of them need be described in detail.

The preferred form of "chair" 12 which has been shown for purposes of illustration comprises a casting of steel or other suitable metal having spaced apart upstanding flanges 15 and 16. One end of the casting is provided with an arcuate shoulder 17 upon which the tension member 6 is disposed to rest. To insure that the tension member 6 will be held firmly upon the arcuate shoulder 17 of the "chair" casting and between the flanges 15 and 16, arcuate bosses or lugs 18 and 19 are provided on the inside surface of the flanges 15 and 16. When the chair casting 12 is mounted in place upon the tension member 6 of the brake beam, it may be firmly clamped thereon by means of a bolt 21 that passes through the flanges 15 and 16 above the tension member 6.

The "chair" casting 12 is provided with a dowel 22 that registers with an aperture 23 in the outer end of the lever 13. In order to secure the "chair" casting 12 in place upon the lever 13, a washer 24 and a bolt 25 are provided. As shown the bolt 25 passes through the "chair" casting, the dowel 22 thereof and the washer 24. When the "chair" casting is so mounted and secured upon the outer end of the lever 13 it acts as a swivel "chair" disposed to operate in a horizontal plane.

The inner end of the lever 13 is provided with an arcuate boss or shoulder 27 that rests upon the upper surface or face of the spring members 2 or 3. A lug or dowel 28 extends downwardly from the boss 27 through an elongated aperture 29 that extends at an oblique angle transversely of the ends of the spring members 2 or 3. The lever 13 may, therefore, move back and forth in the aperture 29 within the limits of the length of the aperture.

In order to insure that the lever 13 will not tilt as a result of pressure at the outer end thereof, an arm 30 having a boss 31 on the underside thereof is provided as an integral part of the chair casting 12. The boss 31 presses on the lever 13 at substantially the middle portion thereof. The lever 13 is, therefore, prevented from tilting because the pressure on the chair casting resulting from the weight of the beam 4 bearing thereon is applied near the inner end of the lever 13. The boss 31 is substantially circular in transverse section and presents a relatively large bearing area upon the lever 13. In operation the lever 13 is free to move back and forth in the aperture or slot 29 and to turn about the boss or dowel 28 as a pivot. The chair casting 12 being fixedly mounted on the tension member 6 of the brake beam, and swivelly mounted in the outer end of lever 13, is free to turn with reference to the lever 13 about the dowel 22 acting as a swivel.

Since in operation the brake beam 4 moves back and forth in a horizontal plane as an ideal condition conducive to equal wear on the wearing surface of the brake shoes 10, the pressure or force, applied in an upward direction sufficient to maintain the brake beam 4 in a horizontal position, is always supplied by the springs 2 and 3 through the lever 13 and the "chair" casting 12. The upward force exerted by the springs 2 and 3 through the lever 13 and the "chair" casting 12 is maintained substantially constant because the chair moves in substantially a horizontal plane simultaneously with the movement of the brake beam.

While various modifications may be made in the device arranged and constructed in accordance with the invention disclosed herein without departing from the spirit and the scope thereof, it is to be understood that only such limitations shall be placed on the invention as are imposed by the prior art and the appended claims.

What I claim as new and desire to secure by Letters Patent is:

1. A swivel chair for a brake beam support and safety device, comprising a member arranged to be turnably mounted on the safety device, a clamp for the brake beam, and means for pivotally securing the clamp to the member.

2. A swivel chair for a brake beam support and safety device, comprising a member arranged to be turnably mounted on the safety device, a clamp for the brake beam, means for pivotally securing the clamp to the member and means on said clamp arranged to press downwardly on said member at a point intermediate its ends.

3. A device for supporting a brake beam on a spring member mounted on a spring plank that comprises a lever adapted to be journalled in the spring member and disposed for movement in a plane substantially parallel to the plane in which the brake beam moves and a clamp disposed for mounting on the brake beam, said clamp being journalled in said lever.

4. A device for supporting a brake beam on a spring member mounted on a spring plank that comprises a lever adapted to be journalled in the spring member and disposed for movement in a plane substantially parallel to the plane in which the brake beam moves, a clamp disposed for mounting on the brake beam, said clamp being journalled in said lever and a lug on said clamp pressing downwardly on said lever at a point intermediate its ends.

5. A device for supporting a brake beam on a spring member mounted on a spring plank that comprises a lever adapted to be journalled in the spring member and a clamp disposed for mounting on the brake beam, said clamp being journalled in said lever.

6. A device for supporting a brake beam on a spring member mounted on a spring plank that comprises a lever adapted to be journalled in the spring member, a clamp disposed for mounting on the brake beam, said clamp being journalled in said lever and a lug on said clamp pressing downwardly on said lever at a point intermediate its ends.

7. A device for supporting a brake beam on a spring member mounted on a spring plank that comprises a lever adapted to be journalled in the spring member, said lever having a boss provided with a curved bearing surface arranged to bear on said spring member and a clamp disposed for mounting on the brake beam, said clamp being journalled in said lever.

8. A device for supporting a brake beam on a spring member mounted on a spring plank that comprises a lever adapted to be journalled in the spring member, said lever having a boss provided with a curved bearing surface arranged to bear on said spring member, a clamp disposed for mounting on the brake beam, said clamp being journalled in said lever and a lug on said clamp pressing downwardly on said lever at a point intermediate its ends.

In testimony whereof, I have hereunto subscribed my name this 26th day of September, 1929.

HARRY T. ANDERSON.